(12) United States Patent
Fieschi et al.

(10) Patent No.: US 6,628,198 B2
(45) Date of Patent: Sep. 30, 2003

(54) SECURITY SYSTEM FOR PREVENTING A PERSONAL COMPUTER FROM BEING STOLEN OR USED BY UNAUTHORIZED PEOPLE

(75) Inventors: Jacques Fieschi, Saint Laurent du Var (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/683,776

(22) Filed: Feb. 13, 2002

(65) Prior Publication Data

US 2002/0133713 A1 Sep. 19, 2002

(30) Foreign Application Priority Data

Feb. 15, 2001 (EP) .............................. 01480010

(51) Int. Cl.$^7$ ................................ G08B 13/14
(52) U.S. Cl. ............... 340/568.1; 340/5.65; 340/539.1; 340/568.3
(58) Field of Search .................. 340/568.1, 568.2, 340/568.3, 5.1, 5.2, 5.3, 5.31, 5.33, 5.6, 5.61, 5.64, 5.65, 539.1; 235/375; 713/200

(56) References Cited

U.S. PATENT DOCUMENTS 5,406,261 A        4/1995   Glenn ......................... 340/571
5,737,582 A  *  4/1998   Fukuzumi .................... 710/301
5,748,084 A  *  5/1998   Isikoff ......................... 340/568.1
5,963,131 A  * 10/1999   D'Angelo et al. ......... 340/568.1
6,014,079 A  *  1/2000   Huang .................. 340/568.1 X
6,266,724 B1 *  7/2001   Harari et al. ................ 710/102
6,425,084 B1 *  7/2002   Rallis et al. ................. 713/185

FOREIGN PATENT DOCUMENTS

EP           01 01362 A      1/2001
GB           2 303 173 A     2/1997

OTHER PUBLICATIONS

Reade L: "Keeping Track of Your Laptop, PCS and Laptops are very Easy to Steal. But an Anti theft Device, Based on a Radio Pager, May change all that" New Electronics, International Thomson PublishingLondon, GB, VII. 29, No. 17, Oct. 8, 1996, p. 91.

* cited by examiner

Primary Examiner—Thomas Mullen
(74) Attorney, Agent, or Firm—Derek S. Jennings

(57) ABSTRACT

Security system for preventing a personal computer (PC) including at least a location in the PC adapted to receive a PCMCIA card from being used by unauthorized people including an extractable card having a connection adapted to insert the extractable card into the location for receiving a PCMCIA card. Further included are a processor and a wireless transceiver for remotely transmitting alarm information relative to the PC. Still further included is a program stored in the memory of the PC for communicating with the processor in order to activate selected security functions.

21 Claims, 2 Drawing Sheets

SECURITY SYSTEM FOR PREVENTING A PERSONAL COMPUTER FROM BEING STOLEN OR USED BY UNAUTHORIZED PEOPLE

BACKGROUND OF INVENTION

1. Technical Field

The present invention relates to systems at the disposal of users to prevent their personal computer such as portables or notebooks from being stolen or hacked and relates in particular to a security system for preventing a personal computer from being stolen or used by unauthorized people.

2. Background

As personal computers are targets for hackers and thieves, passwords are used to protect the vital data or prevent the computer from being used by unauthorized people. These passwords are in conjunction with encryption and authentication keys used to establish secure communications between computers. It is possible today to install a program in the computer that will encrypt sensitive data so that these data cannot be read by anyone who does not have the unlocking key. But it is necessary to store the key somewhere, and if this key is not complex, it will be found.

Despite the constant development of new technologies, passwords are still the most common security tools; they are also the most abused, and often the easiest for an attacker to break. Passwords present a kind of security paradox. The best passwords are the most difficult to guess: long and random. Unfortunately, these are also the most difficult to remember. Moreover, most experts strongly recommend to use different passwords for each e-mail, e-commerce, or other account, and that you change them regularly. As a result, most people either choose easily guessable passwords, or write them down where they can be copied or stolen.

The answer to this conundrum is to use password safes. These programs provide a space to store the long, complex, or random passwords, and then encrypts them so that they cannot be stolen. Some password safes will even generate random passwords for you. But they are located on your disk and need also a password to activate the software.

For preventing a PC from being stolen, a standalone alarm system can be used. It is implemented on a PC card which is used as an intermediate device for connecting to the monitor and printer via a cable and special security tabs. If anyone disconnects the cables or takes apart the PC or if the power is off and someone attempts to use the computer without entering a special electronic security key, a deafening alarm sounds. But, such a system is efficient only when the user or someone else can hear the alarm.

If nobody is present, the thief has time enough to stop the alarm or even if the alarm is not stopped, to escape with the PC.

SUMMARY OF INVENTION

Accordingly, a feature of the invention is to provide a security system to be installed on existing personal computers having at least a location for a PCMCIA card, such a system enabling the authorized user to be automatically warned if anyone attempts to steal their PC or to use it without being authorized.

Accordingly, the feature of the present invention relates therefore to a security system for preventing a personal computer (PC) that includes at least a location in the PC adapted to receive a PCMCIA card from being used by unauthorized people having an extractable card having a connection element adapted to be inserted into the location for receiving a PCMCIA card, and including a processor and wireless transceiver for remotely transmitting alarm information relative to the PC. A further feature includes a program stored in the memory of the PC for communicating with the processor in order to activate selected security functions.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

The above and other objects, features and advantages of the invention will be better understood by reading the following more particular description of the invention in conjunction with the accompanying drawings.

DETAILED DESCRIPTION

Figure 1:
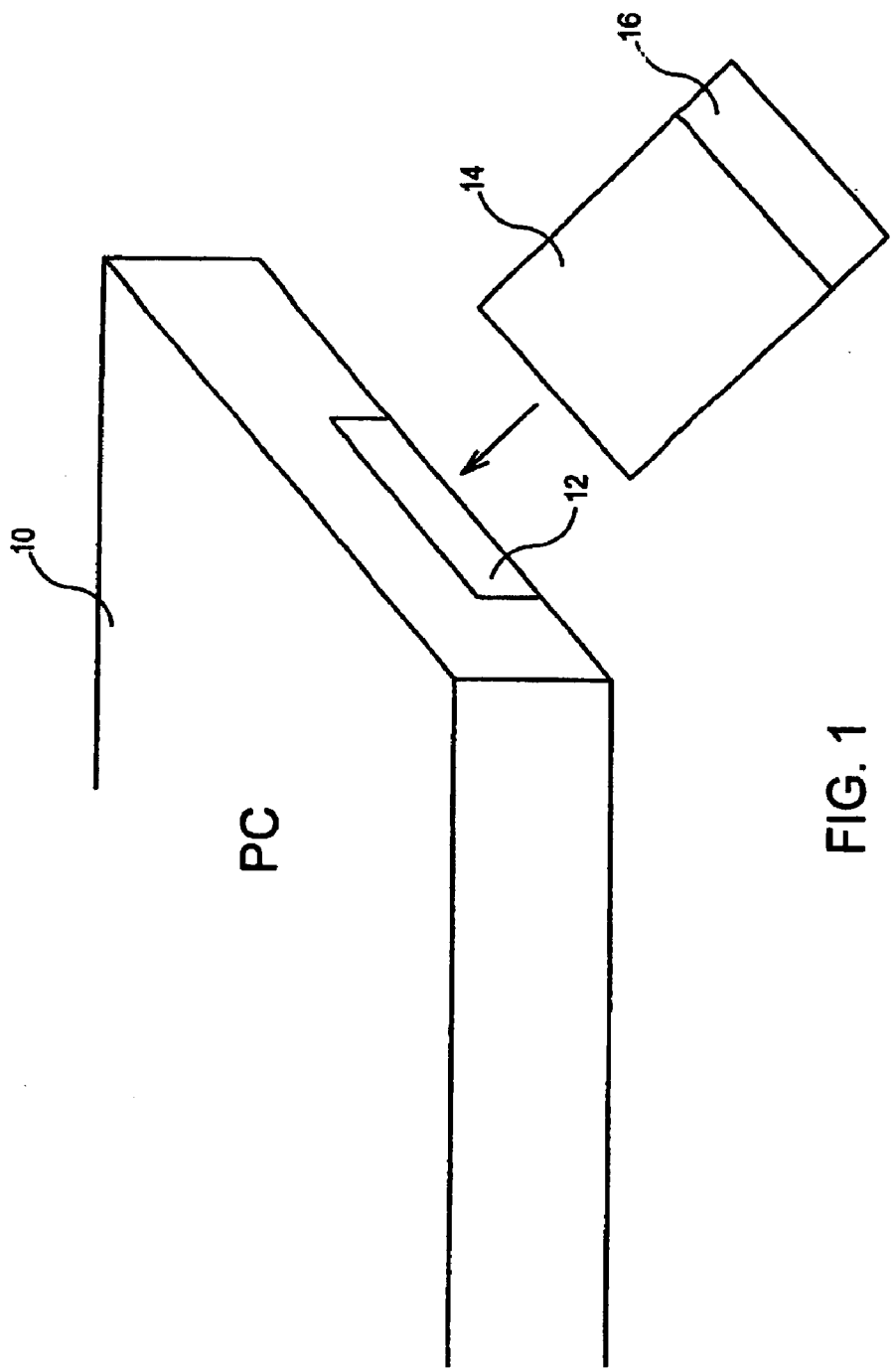
FIG. 1 is a schematic representation of a personal computer having a PCMCIA slot enabling a user to insert an extractable card and a removable key connected thereto according to the invention.

In reference to FIG. 1, the security system according to the invention can be implemented with a personal computer 10 having an interface slot 12 for inserting a PCMCIA card 14. Today, all personal computers have such a PCMCIA interface and also include a battery to support the PC when it is not connected to an AC plug. Such PCs are running an operating system stored on the hard disk.

According to the invention, an extractable card 14 includes a plurality of security features on it for insertion into the slot 12. This extractable card includes a removable key 16 for enabling the user to receive security signals when he is remote from the PC as explained in the following description.

Figure 2:
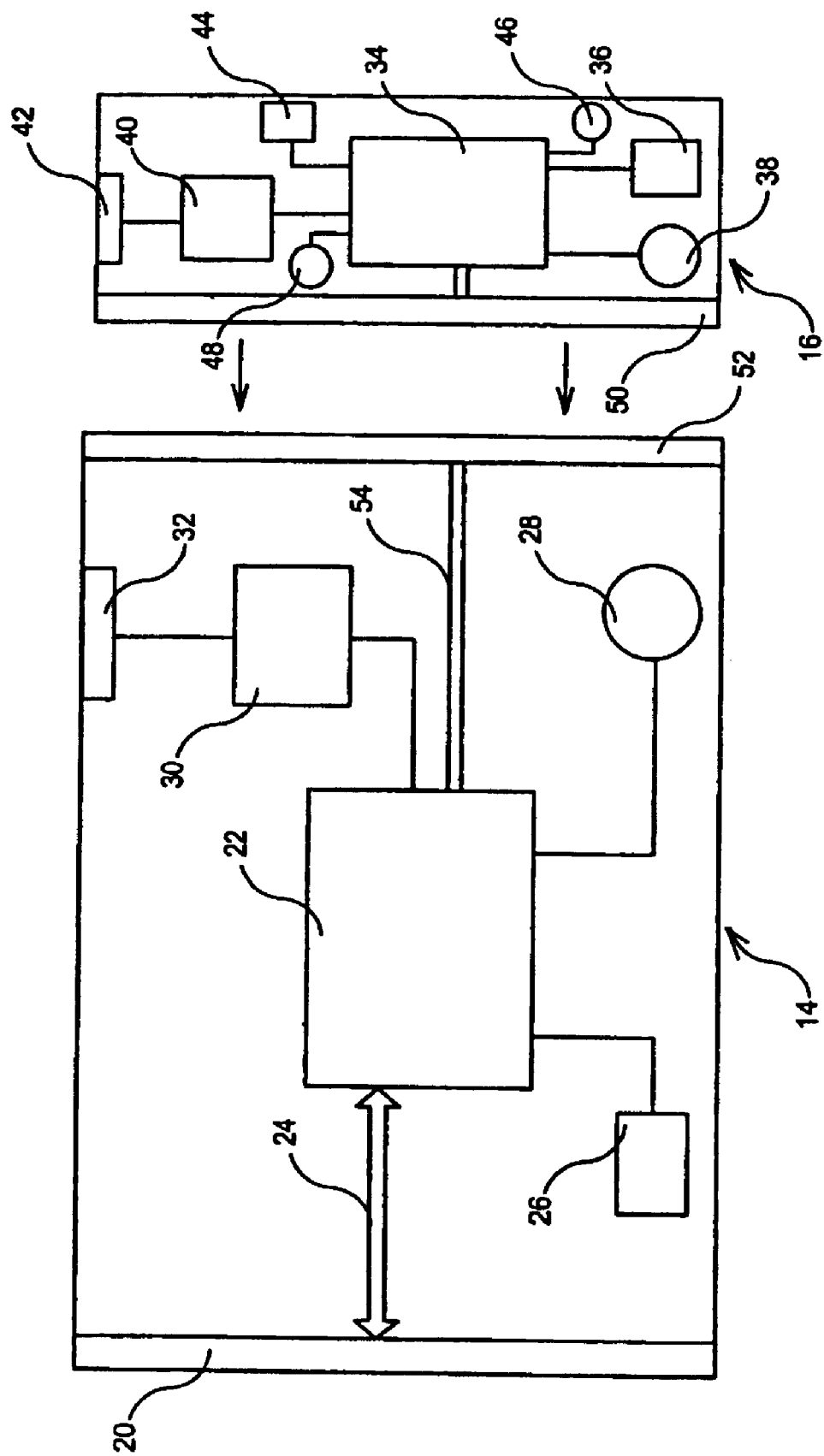
FIG. 2 is a block-diagram representing all the features included in the extractable card and the removable key according to the invention.

As illustrated in FIG. 2, the extractable card 14 includes a connector 20 to connect the card to the PCMCIA connection, a processor 22 linked to the connector 20 by a bus 24 and adapted to control all the functions of the extractable card, a battery 26, a buzzer 28, a radio transceiver 30 and its antenna 32. The removable key 16 also includes a processor 34, a battery 36, and a buzzer 38. Furthermore, it includes a radio transceiver 40 and its antenna 42 to receive radio signals emitted by the radio emitter 30 of the extractable card 14, and some other features like a motion detector 44, a LED 46 and press button 48 the operation of which will be explained in the following. The removable key 16 is connected to extractable card 14 by means of a connector 50 adapted to be firmly connected with a connector 52 of the extractable card. Note that the extractable card processor 22 and the removable key processor 34 are connected together by means of a bus 54 when the removable key is attached to the extractable card.

In combination with the extractable card and the removable key, the security system according to the invention also comprises a security program stored in the memory of the PC with the operating system of the PC in order to activate the different security functions associated with the extractable card and the removable key.

The main security functions which are detailed hereafter are the following:
  Secure operating system boot;
  Encryption/decryption of selected files;
  Motion detector mode;
  Power detection mode; and
  Secure communication between the extractable card and the removable key
  Secure Operating System Boot When this function is activated through the security program, the PC will only boot if the extractable card with the attached key 16 is inserted in the PCMCIA slot.

At the boot time, the operating system of the PC requests access securely to the extractable card and the PC grants authorization only if the removable key is connected to the extractable card inasmuch as the removable key provides a one time synchronized unique password to the extractable card. The extractable card validates the one time password of the removable key by using its one time password and as a result sends the boot authorization to the PC. Note that, after a configurable number of consecutive unsuccessful trials, the security program will destroy itself.

Encryption/Decryption of Selected Files

Selected files can be defined in the security program as needed to be dynamically encrypted/decrypted whenever they are used. However, the encryption/decryption will not be made in the PC itself because the PC software can be hacked or tricked by hackers (the software would be visible in the hard disk data). Instead, such a processing is made by the processor 22 of the extractable card. For this, the encryption process will use a 128 bits encryption key available only in the removable key 16 after authentication through the use of the one time password as explained above. Thus, the PC could be used by an external user in agreement with the PC owner, but sensitive files cannot be accessed even with some tricky software because they cannot be decrypted.

Note that, after authentication, the extractable key and the removable key connected together exchange information regularly in order to synchronize the one time password. This process is necessary to avoid a discrepancy due to clock shift over a long period of time between the clocks of both extractable card and removable key. A regular authentication is also necessary between the PC and the extractable card and a similar regular exchange of information takes place between them in order to synchronize the one time password used to encrypt/decrypt the exchanged data.

Motion Detector Mode

When this function is set in the security program, the removable key 16 has to be connected to the extractable card. Any motion above a configured threshold is detected by motion detector 44 of the removable key 16. When the alarm is raised because a motion is detected (e.g. when unauthorized people try to steal the PC) the following actions can be configured by the security program:
  Beep the PC buzzer;
  Beep the buzzer 28 of extractable card 14;
  Beep the buzzer 38 of removable key 16; and
  Freeze the PC.
  Power Detection Mode When this mode is set in the security program, an alarm will be activated when either the AC plug is removed, or the PC battery is removed or the PC is powered off or the extractable card is removed.

The actions are configurable for the security program:
  Beep the PC buzzer;
  Beep the buzzer 28 of extractable card 14;
  Beep the buzzer 38 of removable key 16; and
  Freeze the PC.
  Secure Communication Mode Between the Extractable Card and the Removable Key This mode is activated when the removable key 16 is removed from the extractable card 14 by the PC owner who is at a location remote from his PC.

In the two preceding cases when the motion detector mode or the power detection mode is set, the extractable card 14 transmits encrypted data based on the one time password mentioned above to the removed key 16 by means of the radio transceiver 30 and the antenna 32. This information is received by removable key 16 by means of the antenna 42 and the radio transceiver 40. Upon reception of the encrypted data, the buzzer 38 of the key 16 will start beeping. If press button is pressed during at least a predetermined time, e.g. 4 seconds, the buzzer stops beeping and the LED 46 starts flashing. LED 46 will flash at a refresh rate proportional to the level of the radio signal received by antenna 42, giving thus an indication of the distance between the extractable card and the removable key so that the PC owner may determine whether his PC has been stolen or moved.

It must be noted that radio detectors may be provided at the gates of a building so that the information received by these detectors enables one to detect where the stolen PC is located in the building.

In conclusion, by using the different security functions provided by the security system according to the invention, the following features can be used: The PC owner can get encrypted sensitive data that is only accessible with the removable key;

When positioned in some location (table, desk . . . ) and whenever the PC is significantly moved by an unauthorized person, the PC will generate an audible alarm alerting the people staying near the PC;

When the extractable card is significantly moved, an alarm is generated to alert the remotely located PC owner who has the removable key with him;

When stolen in a room of a building, the PC can be identified through the use of radio detectors located at the gates of the building; and If a thief tries to prevent the different functions from being activated by removing either the extractable card, the AC power, or the battery, the alarm will still occur if these items are removed from the computer.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

We claim:

1. A security system for preventing a personal computer (PC) from being used by unauthorized people comprising:
  an extractable card having a connection element, said extractable card adapted to be inserted into a location for receiving a PCMCIA card and including a processor and wireless transceiver for remotely transmitting alarm information relative to said PC;

a program adapted to be stored in a memory of said PC for communicating with said processor in order to activate selected security functions; and a removable key normally connected to said extractable card comprising a wireless transceiver for receiving said information relative to said PC when said removable key has been removed from said extractable card.

2. The security system according to claim 1, wherein said extractable card includes a buzzer and said removable key includes a motion detector, said buzzer emits a sound when said motion detector has detected motion.

3. The security system according to claim 2, wherein said removable key also includes a buzzer which starts beeping when said motion detector has detected motion.

4. The security system according to claim 3, wherein said buzzer on said extractable card starts beeping when said program detects if an AC plug is removed.

5. The security system according to claim 3, wherein said buzzer in said removable key starts beeping when said program detects if an AC plug is removed.

6. The security system according to claim 5, wherein said wireless transceiver in said extractable card transmits alarm information to said wireless transceiver in said removable key which has been removed from said extractable card when said motion detector has detected motion.

7. The security system according to claim 5, wherein said wireless transceiver in said extractable card transmits alarm information to said wireless transceiver in said removable key when said program detects that the AC plug is removed.

8. The security system according to claim 6, wherein said removable key further includes a press button and a LED so that, when said removable key is removed from said extractable card, said buzzer on said removable key stops beeping as soon as said press button is pressed.

9. The security system according to claim 8, wherein said LED starts flashing as soon as said press button has been pressed.

10. The security system according to claim 3, wherein said buzzer on said extractable card starts beeping when said program detects that the PC battery is removed.

11. The security system according to claim 3, wherein said buzzer in said removable key starts beeping when said program detects that the PC battery is removed.

12. The security system according to claim 5, wherein said wireless transceiver in said extractable card transmits alarm information to said wireless transceiver in said removable key when said program detects that the PC battery is removed.

13. The security system according to claim 5, wherein said wireless transceiver in said extractable card transmits alarm information to said wireless transceiver in said removable key when said program detects that said extractable card is removed.

14. The security system according to claim 5, wherein said wireless transceiver in said extractable card transmits alarm information to said wireless transceiver in said removable key when said program detects said PC is powered off.

15. The security system according to claim 3, wherein said buzzer on said extractable card starts beeping when said program detects that said extractable card is removed.

16. The security system according to claim 3, wherein said buzzer on said extractable card starts beeping when said program detects that said PC is powered off.

17. The security system according to claim 3, wherein said buzzer in said removable key starts beeping when said program detects that the said extractable card is removed.

18. The security system according to claim 3, wherein said buzzer in said removable key starts beeping when said program detects that said PC is powered off.

19. The security system according to claim 1, wherein said program is set for said PC to boot only after receiving an authorization from said extractable card, said authorization being given after said extractable card has validated a one time password sent from said removable key to said extractable card, this validation being performed by using the one time password in said extractable card.

20. The security system according to claim 19, wherein said extractable card and said removable key exchange information regularly in order to synchronize their one time passwords.

21. The security system according to claim 1, wherein said program is set or selected files to be encrypted and decrypted by said processor in said extractable card by using an encryption key available in said removable key.

* * * * *